Sept. 20, 1971   F. E. OBERMAIER ET AL   3,606,149
VALVE AND THERMOSTAT CONTRUCTION
Filed April 22, 1969
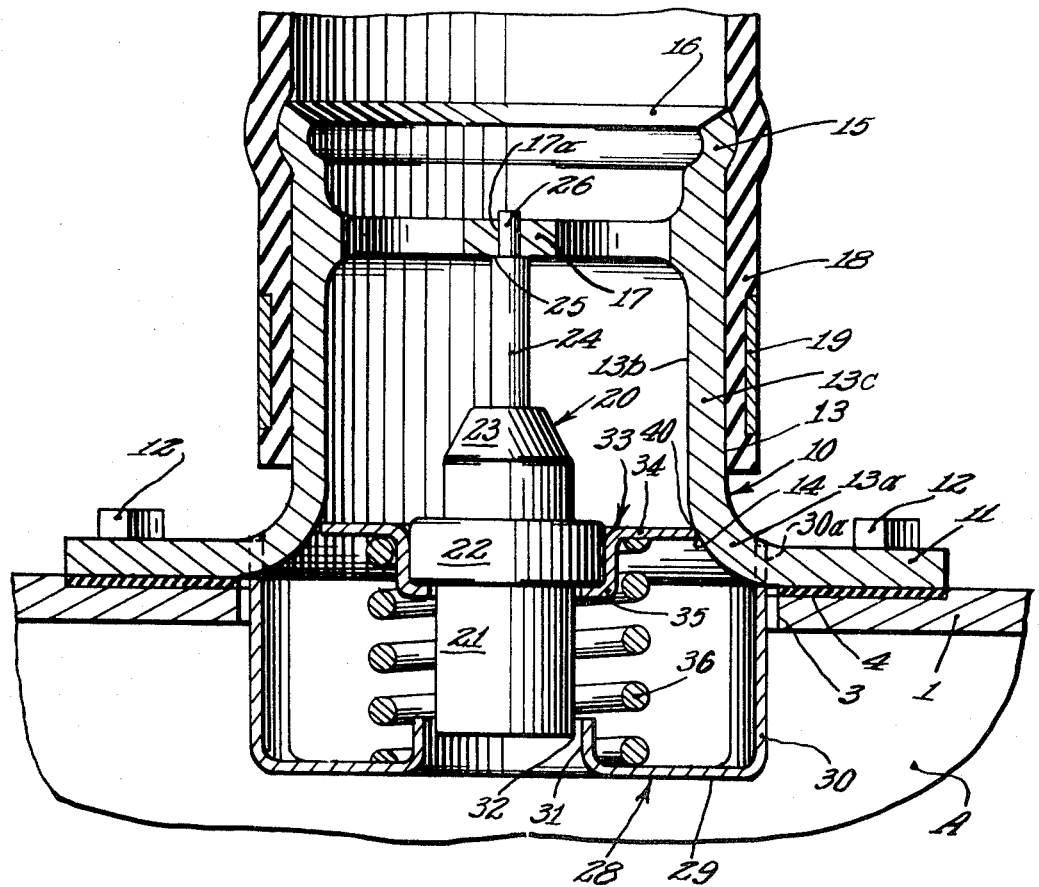
INVENTORS
Frank E. Obermaier
Nello L. Benedetti
BY Hill, Sherman, Meroni, Gross & Simpson ATTORNEYS United States Patent Office 3,606,149
Patented Sept. 20, 1971

3,606,149
VALVE AND THERMOSTAT CONSTRUCTION
Frank E. Obermaier, Park Ridge, and Nello L. Benedetti, Mount Prospect, Ill., assignors to Eaton Yale & Towne Inc., Cleveland, Ohio
Filed Apr. 22, 1969, Ser. No. 818,280
Int. Cl. F01d 7/16
U.S. Cl. 236—34
5 Claims

ABSTRACT OF THE DISCLOSURE

Attachment of a valve and an associated thermostat directly on an outlet fitting of an engine to control coolant flow between the engine and a heat exchange means reduces manufacture and assembly cost by reducing the number of parts and facilitating installation. The valve seats directly against an internal surface of the fitting by means of a power unit having one end connected to an internal portion of the fitting. Likewise a thermostat guide bracket is also attached to the fitting.

BACKGROUND OF THE INVENTION

(1) Field of the invention

This invention generally relates to temperature responsive control means and more specifically to an improved thermostatically operated valve and mounting means therefor for use in an engine cooling system.

(2) Prior art

It is well known to position a separate valve and a thermostat construction in a coolant line between an automobile engine cooling jacket and a radiator to control the flow therebetween.

It is also known that engines capable of meeting modern day requirements must be able to generate greater amounts of power than in the past and yet be of a minimum size. Moreover, although consumers are demanding greater quality, the competition in the market place is requiring a lower cost.

Prior approaches to thermostat construction have not recognized the problem of compactness. Thus, as illustrated by way of example in U.S. Pat. 3,172,602 the throat greatly restricts the flow port passageway thereby reducing the efficiency of the fitting. Moreover, stirrups necessary with prior thermostats aggravate this inefficiency while increasing their costs. Effecting the assembly of the fitting to the engine block with the separate and loose thermostat therein as is now done in the prior art also is costly and time consuming. Thus, to obtain alignment of the thermostat over the port opening additional grooves or equivalent adapter means must be provided.

It may thus be understood that we have recognized a problem in the prior art of oversize fittings, complex flow control structures and costly assembly procedures, all of which are contrary to the increasing demands for greater compactness and lower cost.

SUMMARY OF THE INVENTION

To overcome these and other disadvantages of the prior art we have invented a temperature responsive flow control assembly that combines maximum flow efficiency with low cost of manufacture and assembly. By integrating the design of the flow control assembly with the cooling system fitting we have eliminated, for example a separate stirrup and valve seat and simplified the assembly of the structure. Not only is less material used, but less expensive material is utilized in its place, thereby compounding the savings.

The above beneficial advantages and others are made possible by our invention, which includes a fluid flow control assembly per se and its combination with a cooling jacket and system. The temperature responsive flow control assembly comprises a tubular conduit fitting having a flange on a first end attached to a cooling jacket about an opening in said jacket. A temperature responsive power operated valve means is attached to an integral fitting portion bridging the tubular conduit at a point on the fitting away from the first end.

The power operated valve means includes a power control means, a power transmitting member and a valve closure portion with the power transmitting member having a second end secured to the integral bridging portion of the fitting. A first end of the power transmitting member is connected to the power control means that moves along the power transmitting member in response to changes in temperature of the fluid in the jacket. A valve closure portion is affixed to the power control means, and thus the valve means, in effect, is suspended in the fitting over the opening and, in fact, many extend through the opening whereby the valve closure portion is operable by the power control means to control the flow of fluids through the fitting, and hence out through the opening.

The fitting has what may be termed a throat portion extending over the outlet opening. This throat portion has a seating surface on the interior periphery thereof against which surface the valve closure portion's mating periphery is seated to block flow through said opening and fitting. The power control means moves the valve closure portion through said opening into and out of engagement with the seating surface to respectively close and open the valve in response to changes in temperature of the fluid in the cooling jacket.

A generally U-shaped bracket is attached directly to said flange, or may be formed integrally therewith. This bracket may depend through the opening in the jacket so that the bracket base is in the jacket, while the legs upstanding from each end of the base project up through the opening and are connected at their upper ends with the fitting. An opening in the bracket base having an upstanding flange thereabout serves to guide the power control means, and also provides a convenient seat for a spring means that may be interposed between the bracket and the valve closure portion.

From the above summary of our invention, it may be seen that the disadvantages of the prior art are overcome and that, in fact, the construction is simplified because of the direct mounting of the thermostat, and no additional restrictive adapter is needed between the outlet fitting and the thermostat. Moreover, the parts of the thermostat are larger for a given size of outlet fitting. Thus, since the outer diameter of the valve closure portion is larger than in previous constructions, there is, for a given movement of the closure portion away from the seating surface, a greater annular area of opening, with the result that the response of the thermostat is better and the flow characteristics therethrough are greatly increased.

Other objects, features and advantages of the present invention will be readily apparent from the following detailed description of certain preferred embodiments thereof taken in conjunction with the accompanying drawings, in which:

BRIEF DESCRIPTION OF THE DRAWINGS

The figure is a cross-sectional view through an embodiment of the invention in place on an engine cooling jacket and having a hose means connected thereto.

DESCRIPTION OF THE PREFERRED EMBODIMENT

A portion of an engine cooling system is generally indicated at A, and includes a cooling jacket wall 1 having an opening 3 therethrough. A suitable seal means 4 is provided about the opening 3 to allow fluid-tight connection of a temperature responsive fluid flow control assembly 10 thereto. The flow control assembly may be provided with a flange 11 surrounding the opening for connection to the cooling jacket wall 1 by suitable means, such as the screw means 12 shown or other conventional mechanical or chemical attachment means.

The flow control assembly 10 includes a fitting 13 having a throat portion 13a extending from the flange 11 inwardly in a converging manner until it merges with a conduit portion 13c of the fitting 13. The conduit portion 13c has an internal surface area 13b that is smaller in diameter and area than the opening 3 so that a seating surface 14 is formed on the portion of the throat 13a that projects over the opening.

An enlarged portion 15 may be formed in the fitting adjacent an upper or second end 16. A bridging portion 17 is formed in the conduit interior 13b and may span this opening. We have found it advantageous to integrally form the bridging portion 17 with the fitting conduit 13c. A suitable conduit means 18 is connected about the fitting, and may be securely fastened thereto by suitable means such as a band 19.

A temperature sensitive power unit or power control means 20 may be of the well-known "solid-fill" type and comprises a temperature-sensitive portion 21, a collar 22, a power member guide portion 23, and a power transmitting member 24. The thermostat contains a fusible thermally expansible material within the temperature-sensitive portion 21 which expands when the ambient temperatures rise to or above the critical temperature of the expansible material. The expansible material acts against a diaphragm within the power unit which, in turn, abuts or is connected to the power member 24 so that heating of the temperature-sensitive portion 21 above the critical temperature of the expansible material contained therein will effect relative extensible movement of the power transmitting member 24 from the casing of the power unit. For the purposes of simplicity, that portion of the power unit 20 which includes a temperature-sensitive portion 21, the collar 22, and the guide portion 23 is referred to as the casing or power control means.

It will be noted that the free end of the power transmitting member 24 has an attaching means such as a screw thread or rivet-like means formed therewith which cooperates with a suitable means 17a in the transverse bridging portion 17 to securely hold the power transmitting member 24 and the power control means 20.

The temperature responsive fluid flow control assembly also includes a bracket 28 of a generally U-shaped configuration having a base 29 with an upstanding leg means 30 at either end thereof. The bracket 28 may be integrally formed with the fitting or attached thereto by suitable means. We have discovered that making the bracket generally conforming to the size of the opening 3 will allow upper portions 30a of the legs 30 to project through the fitting and be deformed to securely hold the bracket 28 in place. The bracket has an aperture therethrough with an upturned spring guide portion. A resilient biasing means such as the coil spring 36 surrounds the upturned guide portion 31 and is interposed between the bracket 28 and a valve closure portion generally indicated at 33. This valve closure portion 33 is effective to control the flow of fluid through the internal area 13b of the fitting and includes an out-turned flange portion 34 which is engageable about its periphery with the seating surface 14 to shut off the flow of fluid through the opening 3. The valve portion 33 also has an inwardly extending flange 35 formed integrally therewith which is centrally apertured to receive the temperature-sensitive portion 21 of the power unit 20. The in-turned flange 35 seats upon the collar 22 and is preferably maintained in engagement therewith by means of the resilient biasing means 36 which is interposed between the out-turned flange 34 of the valve portion 33 and the spring guide flange 31 of the bracket 28. The spring 36 thus serves the dual purpose of positively mounting the valve closure portion 33 on the collar 22 and of acting as a means for returning the power unit to a closed position upon cooling of the temperature-sensitive portion 21. The spring means 36 extends around the spring guide portion 31 of the bracket base portion 29 and is thereby maintained in its proper position on the base.

In operation, when the fluid in the cooling system A is cold, as determined by the sensing means 21 of the power control means 20, the power transmitting member 24, which is securely attached to the bridging portion 17, is pulled inwardly into the power control means 20, thereby pulling the power control means 20 and the associated valve closure portion 33 upwardly against the seating surface 14, thereby closing the opening 3 and blocking flow of fluids therethrough. The spring bias means 36 securely held at one end by the bracket base 29 ensures that the valve closure portion 34 moves upwardly and seats firmly against the mating seating surface 14. It is, of course, understood that the periphery of the valve closure portion 34 and the seating surface 14 will be substantially the same in the area of contact 40 so that adequate closure is made.

When the temperatures of the fluids in the system A increase as determined by the sensing means 21, the materials in the power control means 20 force the power transmitting member 24 out of the power control means 20, thereby opening the valve closure portion 34 against the bias of the spring means 36. This, of course, opens the valve to allow flow through the opening 3 through the fitting and attached conduits for circulation in a cooling system.

Mounting the power control means, power transmitting means and valve closure portions directly to the fitting to form a flow control assembly in accordance with the present invention has a number of advantages. The number of parts necessary is reduced, and the parts which are present may be made of less expensive and more easily assembled materials. Moreover, mounting the fitting mounts the fluid flow control assembly so that economies of production are realized. Thus, no adapter is needed between the outlet fitting and the thermostat. Another important advantage is that the parts of the flow control assembly of the present invention are larger for a given size of fitting than would be the parts were the flow control means and fitting made separately. Thus, the valve closure portion 34 of the flow control assembly is larger in diameter than it would be if it operated against an adapter, as is common in the prior art. Also, of course, the flow characteristics of the fluid through the control assembly are markedly improved by the smooth, generally projection-free contours of the present invention. These improved flow characteristics reduce eddying, with its accompanying deposits, and pitting. Since the outer diameter of the valve closure portion 34 is larger than in previous constructions, there is, for a given movement of the valve closure portion 34 away from the seating surface 14 of the fitting 10, a greater annular area of opening between the valve closure portion 34 and the seating surface 14. This allows quicker response for given movements of the power control means.

Spacing the legs of the bracket 28 near the periphery of the opening 3 allows attachment of the bracket in the area of the flange 11. It is to be understood that the bracket 28 may be attached to the fitting 10 in any convenient manner. Thus, we also recognize the provision of protrusions or hooks on the fitting 10 in the area of the flange 11 whereby the upper ends of the upstanding legs 30 may be hooked thereto or snapped over the protrusions, with the resilient biasing means 36 securely holding the bracket 28 in place.

We have thus set out above a novel temperature responsive fluid flow control assembly which is economical to produce in both common materials and exhibits many new and unexpected advantages over the prior art.

Although minor modifications might be suggested by those versed in the art, it should be understood that we wish to embody within the scope of the patent warranted hereon all such modifications as reasonably and properly come within the scope of our contribution to the art.

We claim as our invention:

1. A temperature responsive fluid flow control assembly in combination with a portion of a cooling jacket including an opening in said jacket, said flow control assembly comprising a conduit fitting, said fitting having a first end and a second end, said first end having a flange thereabout, said flange surrounding said opening and being attached to said jacket, and said fitting having a temperature responsive power operated valve means attached to an internal portion of said fitting, said fitting having an inner throat surface, said throat surface including a smoothly configured valve seating surface generally surrounding said opening and being above said opening whereby flow through said fitting is maximized, said power operated valve means comprising a power control means, a power transmitting member, and a valve closure portion, said power transmitting member having a first end connected with said power control means and a second end secured to said internal portion, said power control means connected to said valve closure portion, said power control means moving said valve closure portion through said opening into and out of engagement with said seating surface to respectively close and open said valve in response to changes in temperature of the fluid in said cooling jacket, said internal portion being a transverse portion bridging said tubular conduit at a point in the fitting remote from said seating surface, a U-shaped bracket means attached to said fitting and having the upstanding legs of the U projecting from the base upwardly through said opening in said cooling jacket, and a resilient biasing means restrained between said valve closure portion and said bracket base, said U-shaped bracket being configured so as to present minimum impedance to fluid, said bracket including a base within the cooling jacket, said legs extending upwardly and being adjacent the edges of said opening, said legs being secured with said fitting to center said spacing means and to receive and guide a portion of said power control means.

2. A temperature responsive fluid flow control assembly according to claim 1 wherein said power control means comprises a generally cylindrically shaped temperature sensitive portion, said temperature sensitive portion having a collar thereabout at a point intermediate its ends, said valve closure portion having an inwardly extending flange formed integrally therewith which flange is centrally apertured to receive said temperature sensitive portion therethrough, said inturned flange seating upon said collar and being maintained in engagement therewith by means of said resilient biasing means which is interposed between said valve closure portion and a spring guide flange surrounding said opening in said bracket base.

3. A temperature responsive fluid flow control assembly according to claim 1 including a coil spring biasing means surrounding a portion of said power control means and interposed between said valve closure portion and said bracket to thereby guide the power control means and the valve closure portion associated therewith.

4. A fluid flow control assembly according to claim 1 wherein said fitting has at least two holes therein located in said first end thereof above said cooling jacket opening, said legs having upper portions extending through said holes to secure said U-shaped bracket thereto.

5. A fluid flow control assembly according to claim 4 wherein said leg upper portion projecting through said hole is deformed to secure said bracket and to seal said holes against leakage.

References Cited

UNITED STATES PATENTS

| 1,743,997 | 1/1930 | Davis et al. | 236—34.5X |
| 1,791,572 | 2/1931 | Ornberg | 236—34.5X |
| 3,207,437 | 9/1965 | Bailey | 236—34 |
| 3,315,890 | 4/1967 | Drapeau | 236—34 |
| 1,407,418 | 2/1922 | Hunt | 236—34 |

FOREIGN PATENTS

| 1,275,589 | 10/1961 | France | 236—34 |

EDWARD J. MICHAEL, Primary Examiner